United States Patent [19]

Simon

[11] Patent Number: 4,721,383

[45] Date of Patent: Jan. 26, 1988

[54] PROOFING MACHINE

[76] Inventor: Michael J. Simon, P.O. Box 37500, Louisville, Ky. 40233

[21] Appl. No.: 5,769

[22] Filed: Jan. 21, 1987

[51] Int. Cl.⁴ .............. G03B 27/20

[52] U.S. Cl. .............. 355/91

[58] Field of Search .............. 355/78, 85, 83, 91, 355/113, 120, 94

[56] References Cited

U.S. PATENT DOCUMENTS

| | | | |
|---|---|---|---|
| 2,139,955 | 12/1938 | Huebner | 355/91 X |
| 2,638,040 | 5/1953 | Murphy | 355/113 |
| 2,692,540 | 10/1954 | Bing et al. | 355/113 |
| 2,774,289 | 12/1956 | Colins | 355/91 |
| 3,176,601 | 4/1965 | Bradley | 355/91 X |
| 3,234,868 | 2/1966 | Appeldorn et al. | 355/115 |
| 3,545,860 | 7/1968 | Hutchins | 355/91 |
| 3,584,955 | 6/1971 | Stievenart | 355/91 X |
| 3,644,039 | 2/1972 | Boyer, III | 355/85 |
| 3,682,551 | 8/1972 | Bradley et al. | 355/120 |
| 4,526,463 | 7/1985 | Hickey et al. | 355/83 |
| 4,529,303 | 7/1985 | Ternes | 355/91 |
| 4,585,340 | 4/1986 | Buckingham | 355/91 |
| 4,586,978 | 5/1986 | Kondo et al. | 355/78 X |

*Primary Examiner*—Richard A. Wintercorn
*Attorney, Agent, or Firm*—Banner, Birch, McKie & Beckett

[57] ABSTRACT

There is disclosed in accordance with this invention a proofing machine in which the means for exposing the proof paper comprises a light carriage adapted to be moved by the operator to an open position for loading proof paper and negatives and a closed position where the exposure is initiated and thereafter automatically terminated at the end of the exposure cycle and there is provided means for exposing a plurality of proofs of the same size simultaneously as well as to accommodate proofs of different size comprising a plurality of separate and selectively usable vacuum systems and systems of locator pins.

8 Claims, 9 Drawing Figures

18
19
26
27
24
22
20
25
5
77
78
12
10
11
9
13
66
65
58
1
31
16
49
8
3
2
4

21
6
26
12
8
25
13
10
11
3
14
31
15

24
22

25
3
7
11
31
16
12
10
2

FIG. 4.
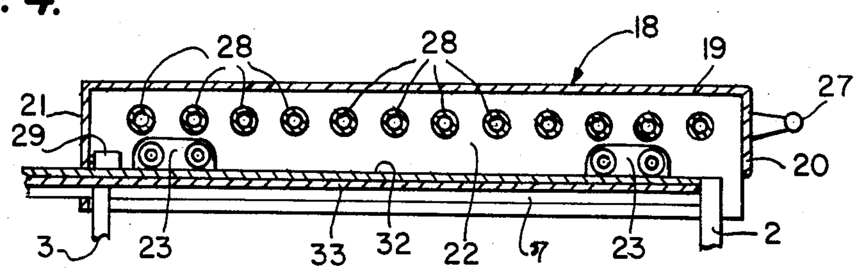
FIG. 5.
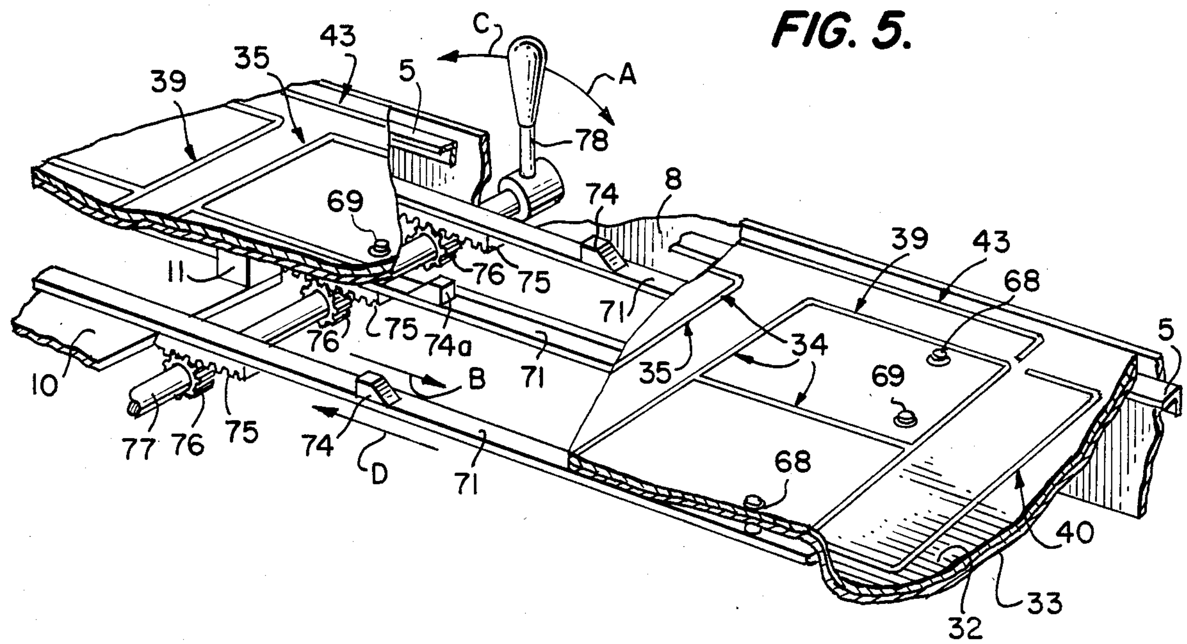
FIG. 6.
70
67
32
33
73
72
74
71
FIG. 7.
70
67
32
33
74
72
73
71

PROOFING MACHINE

BACKGROUND OF THE INVENTION

This invention relates to proofing machines and particularly to the exposure mechanism and to the proof retaining means of the machine.

In printing trade publications for example, after the production of the film negatives and before the final film or printing plates are made, proofs are required to verify the position of the material on the page and its content. Proofs are normally produced by exposing a light sensitive material through the negatives—which may be done in sections while masking the balance of the light sensitive material to build up a page. One material for producing proofs of this nature is DYLUX, a product of E.I. duPont de Nemours and Co. which, when exposed to ultraviolet light, provides a blue-tinted proof that can be readily reviewed.

Proofing machines usually include means for locating the negatives relative to the film and means such as a vacuum for holding the film and the negative firmly in contact during exposure. In machines such as the one disclosed in U.S. Pat. No.3,176,601, pages are exposed one at a time and the machines are therefore slow. To provide for multiple exposures would be complicated by the difficult alignment and holding problems with the negatives as represented by the positioning pins 97 and vacuum channels 92 through 96 of U.S. Pat. No. 3,176,601, and would be particularly difficult in view of the need for versatility in accommodating negatives and films of different sizes. U.S. Pat. No. 4,529,303 also shows a vacuum frame for holding a photosensitive plate while it's being exposed in which there is also provided positioning pins for the work.

Using a light carriage advanced over the work for continuous exposure such as disclosed for example in U.S. Pat. No. 3,644,039 requires that the light carriage be advanced at a precise rate to obtain the proper exposure. This requires a drive mechanism that not only represents an expense but also requires time as the carriage moves at the preselected rate over the film.

SUMMARY OF THE INVENTION

In accordance with this invention, there is provided a proofing machine that is adapted to receive a number of negatives of the same size at the same time and to receive negatives of different sizes. The machine is characterized by a unique arrangement of selectively used vacuum channels and locator pins including common vacuum channels for use with pages of at least two different dimensions, together with a first auxiliary vacuum channel for use with the smaller size negatives and a second auxiliary vacuum channel which, together with the common vacuum channels, is adapted for use with the larger size negatives. A third and still larger negative is adapted to be used in a combination of all or substantially all of the vacuum channels.

The locator pins are adapted to be raised and lowered in sets between their operative and inoperative positions to provide for accurate positioning of the negatives of each set. The light source in accordance with this invention comprises a light carriage having a plurality of ultraviolet lights that is moved manually to its operative position in which it is automatically turned on and off to expose the light sensitive material.

BRIEF DESCRIPTION OF THE DRAWINGS

FIG. 4 is a fragmentary sectional view from front to back through the light carriage of the machine of FIG. 1.

FIG. 5 is a perspective, partly broken away and in section, showing the mechanism for raising and lowering the locator pins.

FIGS. 6 and 7 are detail views of the camming means for raising and lowering the locator pins.

DETAILED DESCRIPTION OF THE INVENTION

Figure 1:
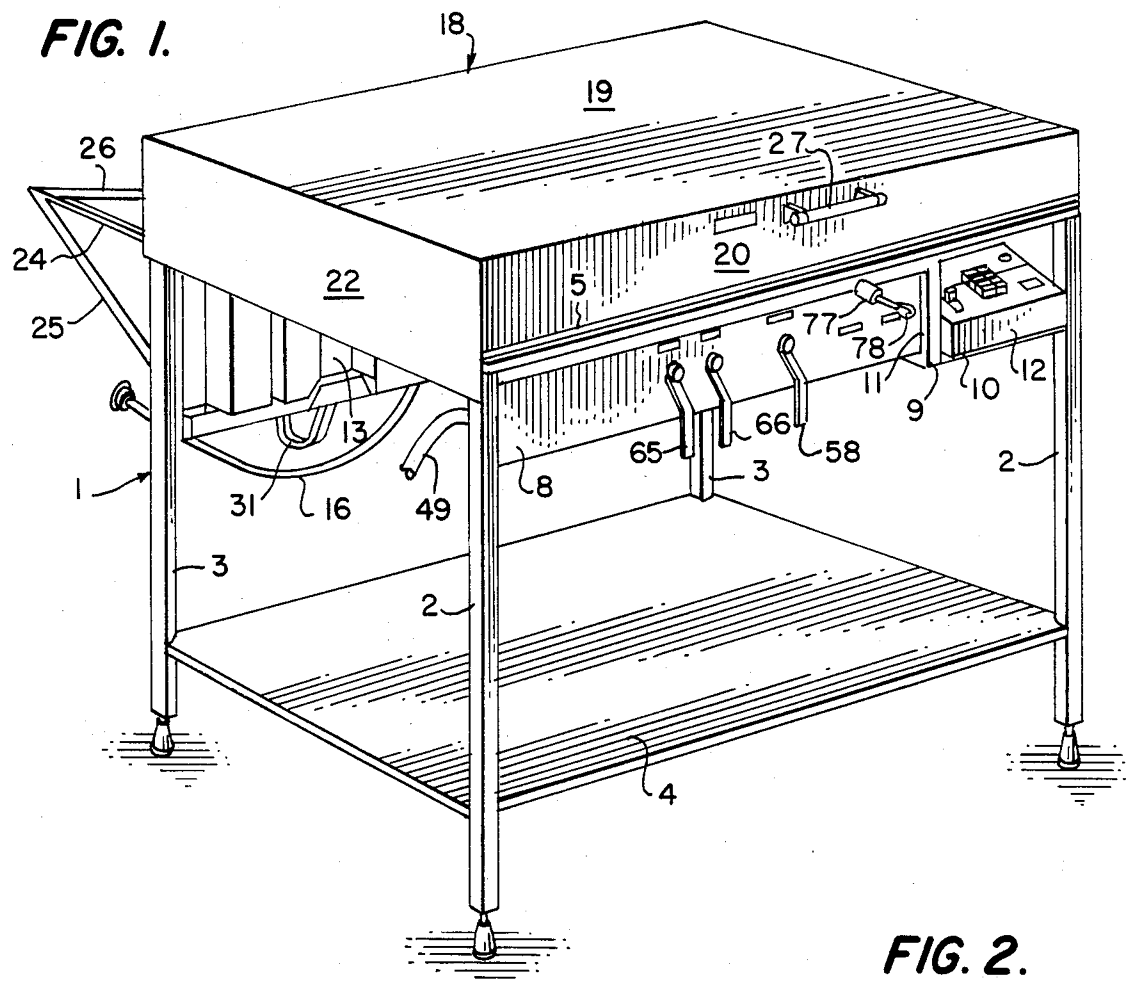
FIG. 1 is a perspective view of a proofing machine in accordance with this invention.
Figure 2:
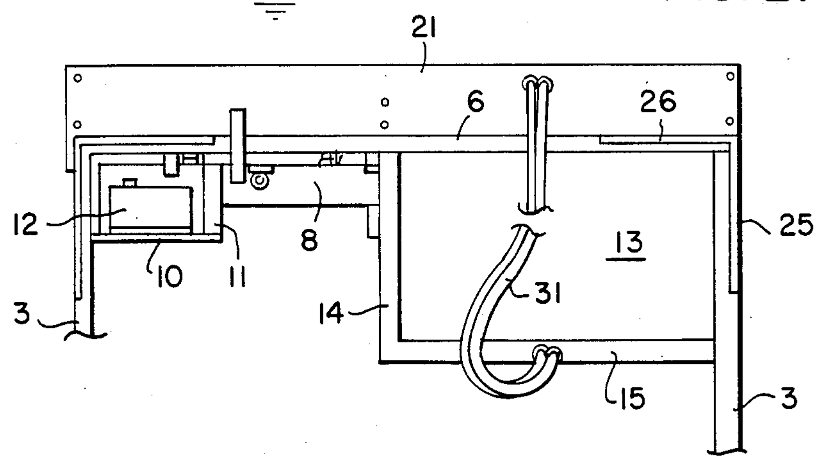
FIG. 2 is a rear elevation view, partly broken away, of the machine of FIG. 1.
Figure 3:
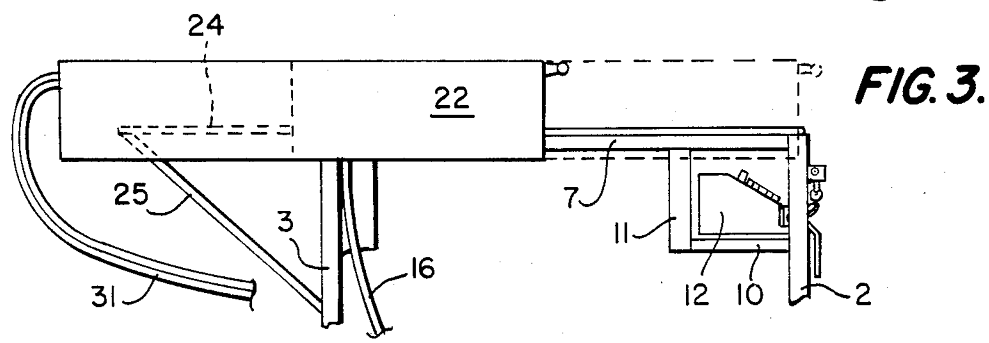
FIG. 3 is a side elevation view, partly broken away, of the machine of FIG. 1.

With reference to FIG. 1 there is shown a proofing machine 1 including a pair of front legs 2 and rear legs 3 that are secured together near the bottom thereof by a plate 4. At their tops, the front legs 2 and rear legs 3 are connected together respectively by front and back rails 5 and 6 (FIGS. 1 and 2) and the front leg and rear leg at each side are connected together by side rails 7 (FIG. 3). A mounting plate 8 extends across the front of the machine frame fron one of the front legs 2 to a support 9 depending from the front rail 5 and carrying a platform 10 that is also supported by a depending support 11 (FIGS. 2 and 3) and by brackets from the adjacent side rail 7. A control panel 12 rests on the platform 10.

A mounting plate 13 is secured at the rear of the machine to a vertical support 14 depending from the rear rail 6 and a horizontal support 15. The plate 13 is adapted to carry the power units for the machine which are adapted to be connected to a source of power as by a cord 16.

The light source for exposing the negatives to the proof paper or film comprises an enclosure or light carriage 18 having a top wall 19 and depending side walls including front and rear walls 20 and 21 respectively and end walls 22. The enclosure is supported for example by pairs of roller assemblies 23 (FIG. 4) comprising rollers journalled on brackets secured to the sidewalls 22 and running in effect on the side rails 7 for rolling between a closed position which is its operative or exposure position as shown in FIG. 1 and in the dotted line position as shown in FIG. 3, and an open or loading position as shown in the full line position in FIG. 3. To support the light carriage 19 in the open position, a pair of rails 24 extend rearwardly from the machine as continuations of the side rails 7. The rails 24 are supported by braces 25 and 26 that angle respectively from the rear end thereof to the rear legs 3 and to the back rail 6. The light carriage 18 has a handle 27 on the front wall 20 for use by the operator in moving the same between its closed position and open position.

The light carriage 18 is provided with a number of ultraviolet fluorescent lamps 28 that are arranged parallel to each other and to the front and rear walls 20 and 21 as well as the top wall 19 and are disposed uniformly across the depth of the light carriage to provide uniform exposure across the entire area covered by the same.

The lamps 28 may be turned on manually or, as preferred, may be turned on automatically when the light carriage is moved into its closed position such as by a microswitch 29 mounted on the rear rail 6 and adapted to be engaged by the rear wall 21 of the light carriage. The lamps 28 are turned off automatically after the predetermined exposure time by a timer in the control panel 12. Power is delivered through the timer to the lamps 28 by a lead 31.

The work supporting surface of the machine comprises a contact frame 32 in the form of a plate. To the lower side of the contact frame 32 there is secured a cover plate 33 as by screws (not shown) extending through the cover plate 33 and threaded into blind holes in the underside of the contact frame 32. The contact frame 32 and cover plate 33 are supported as a unit on the front and back rails 5 and 6 and side rails 7.

Figure 8:
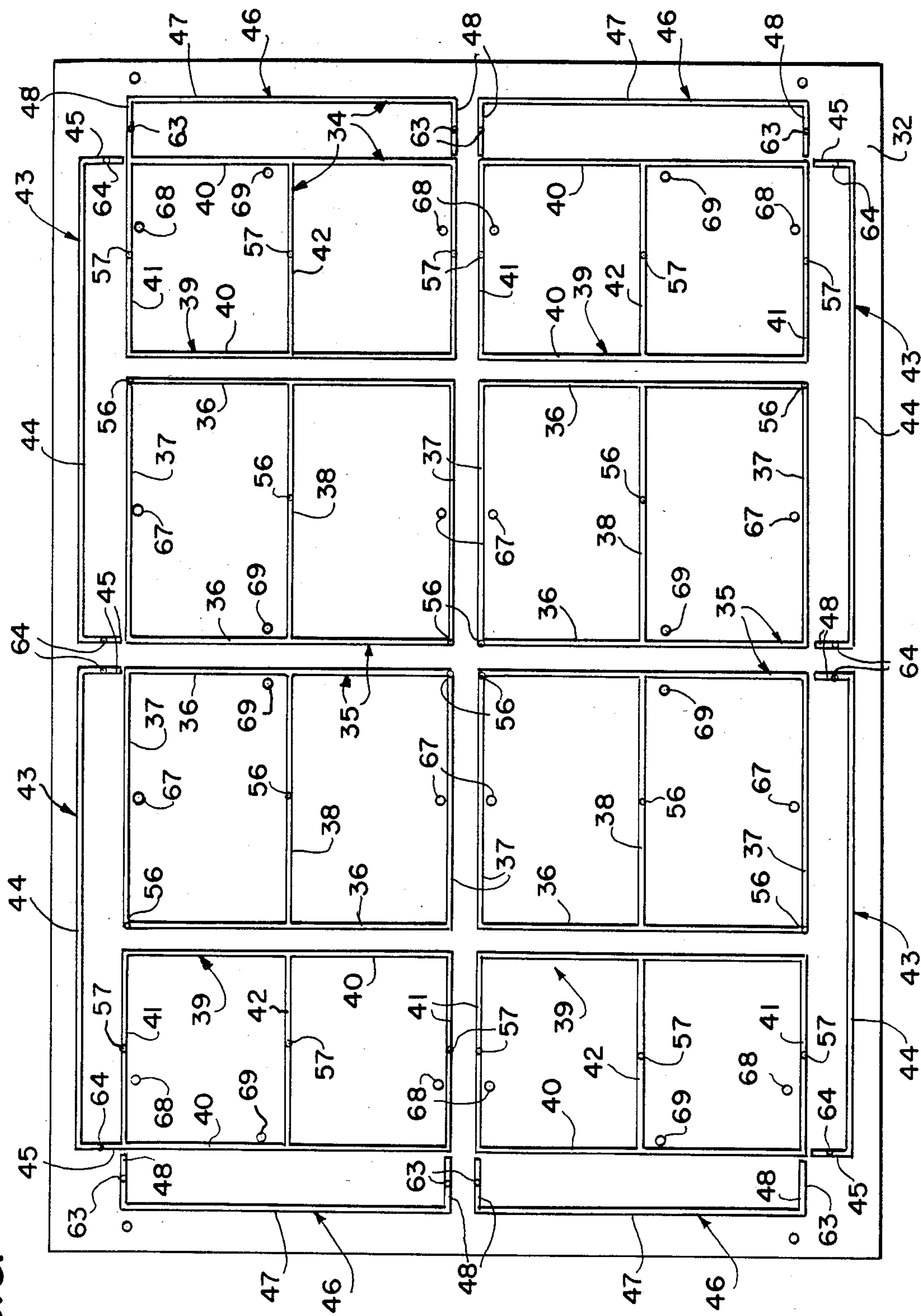
FIGS. 8 and 9 are plan views of the top and bottom respectively of the proof-supporting surface of the machine of FIG. 1.

As shown in FIG. 8, the top surface of the contact frame 32 is provided with a pattern of shallow vacuum channels 34 formed in the surface thereof and defining a plurality of proof positions, specifically eight proof positions for 11"×14" proofs and four positions for 16"×20" proofs, as well as individual proof positions for larger proofs up to the dimension of the contact frame 32.

The vacuum channels 34 are arranged in three separate vacuum systems that are adapted to be used selectively with proofs of different sizes.

The first of the three vacuum systems is common to all sizes of proofs and includes a side-by-side arrangement of a first set of four rectangular sets of channels 35 each of which has a pair of channels 36 along the major sides thereof and a pair of channels 37 along the minor sides thereof, and a cross channel 38 parallel to the channels 37 and extending between and interconnected with the channels 36 at the centers thereof. The four sets of channels 35 are arranged as shown in a rectangle with one of the channels 36 of each of the sets of channels parallel to a corresponding channel 36 of another set of channels and spaced therefrom. One of the channels 37 of each of the rectangular sets of channels 35 is also parallel to and spaced from a corresponding channel 37 of the adjacent set of channels 35. Each of the sets of channels 35 is dimensioned to receive an 11"×14" proof paper with the channels 36 and 37 disposed about one-half inch inwardly from the edge of the proof paper and with a minimum spacing between the adjacent edges of the proof paper—the channels 36 and 37 thus defining for example a rectangle that is 10"×13" with a spacing of about one inch between the channels of the adjacent sets of channels.

In addition to the first set of channels 35, the first vacuum system also includes four rectangular sets of channels 39, each of which has a pair of channels 40 along the major sides thereof and a pair of channels 41 along the minor sides, and cross channels 42 parallel to the channels 41 and extending between and interconnected with the channels 40 at the centers thereof. The sets of channels 39 are arranged in pairs with one of the channels 41 of each pair parallel to a corresponding channel 41 of the adjacent set of channels 39 and spaced therefrom about the same distance as the spacing between the channels 36 of the sets of channels 35.

Each pair of the sets of channels 39 is disposed outwardly of the sets of channels 35 and is arranged with the channels 40 at one side thereof parallel to and spaced from the adjacent channels 36 of the sets 35. The channels 40 are the same in length as the channels 36 so that the channels 41 will in effect be co-linear with the channels 37. The channels 41 are however shorter than the channels 37 by an amount whereby the channels 36 and 40 of adjacent sets of channels 35 and 39, together with the spacing between the opposed channels 36 and 40 of those sets of channels are adapted to accommodate the twenty inch dimension of a 16"×20" proof paper with the outermost channels 36 and 40 one-half inch inwardly from the edges of the paper. Accordingly, as illustrated, the channels 40 and 41 define a rectangle that is 8"×13".

The second of the vacuum systems comprises four sets of auxiliary channels 43 that include a channel 44 co-extensive with and parallel to the channels 37 and 41 along the outer edges of the sets 35 and 39. The channels 44 are spaced from the adjacent channels 37 and 41 by an amount whereby the sixteen inch dimension of 16"×20" proof paper can be accommodated between the channels 44 and the channels 37 and 41 at the opposite ends of the respective sets 35 and 39 with the channels disposed about one-half inch inwardly from the edges of the proof paper—which in the illustrated embodiment is about two inches which is the difference between the sixteen inch dimension of the 16"×20" proof paper and the width of the sets of channels 35 and 39 between the pairs of channels 37 and 41 (which is thirteen inches) and a one-half inch overlap of the proof paper beyond the channels 37 and 41 at the one side and the channel 44 at the other side. The sets of channels 43 also include a pair of channels 45 interconnected with and extending from the ends of the channels 44 in alignment with the channels 36 and 40.

The third of the vacuum systems comprises four sets of auxiliary channels 46 that include a channel 47 co-extensive with and parallel to the outermost channels 40 of the sets 39. The channel 47 are spaced from the adjacent channels 40 by an amount whereby the eleven inch dimension 11"×14" proof paper can be accommodated between the channels 47 and the channels 40 at the opposite sides of the sets 39 with the channels disposed about one-half inch inwardly from the edges of the proof paper—which in the illustrated embodiment is about two inches which is the difference between the eleven inch dimension of the 11"×14" proof paper and the width of the sets of channels 39 between the channels 40 (which is eight inches) and a one-half inch overlap of the proof paper beyond the channels 40 and 47. With a one-quarter inch overlap, for example, the spacing would be two and one-half inches.

Figure 9:
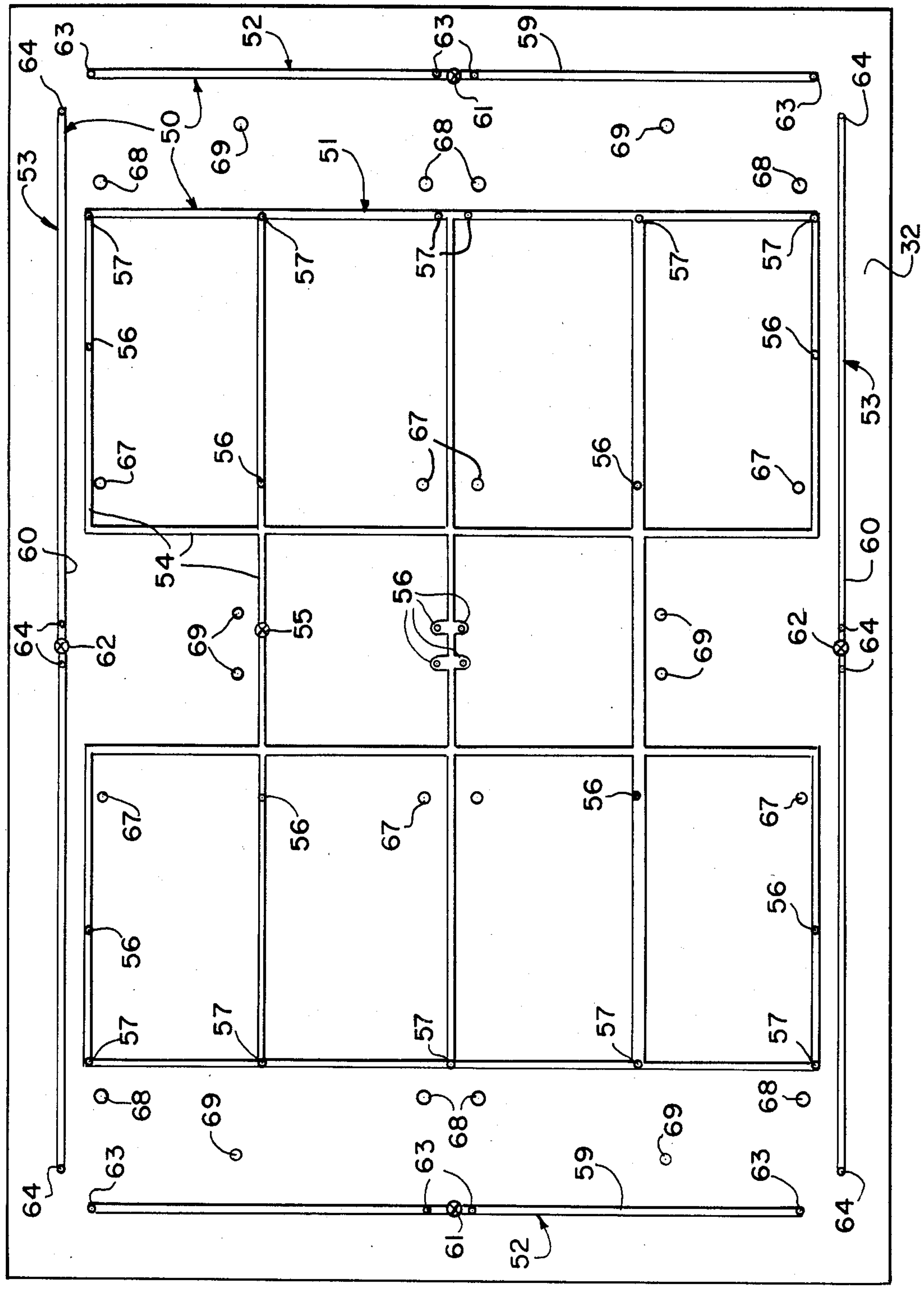

Vacuum is supplied to the machine through a vacuum line 49 from any suitable source (not shown). As seen in FIG. 9, vacuum is applied to the sets of vacuum channels 34 through a vacuum distribution system 50 which comprises three separate vacuum systems, 51, 52 and 53 corresponding to the three sets of channels 35–39, 43 and 46. The channels 51, 52 and 53 are formed as channels in the underside of the contact frame 32 and are closed at the bottom by the cover plate 33.

The vacuum system 51 comprises a network of interconnected vacuum channels 54 formed in the bottom of the frame 32 beneath the sets of channels 35 and 39. The vacuum system 51 is adapted to be connected to the source of vacuum by a fitting (not shown) that may be threaded into a bore through the cover plate 33 and intersects the vacuum channels 54 at a vacuum intake point 55. The vacuum channels 54 are connected to the sets of channels 35 by bores 56 through the contact frame 32, and to the sets of channels 39 by bores 57 through the contact frame. Application of vacuum to the system 51 is controlled by a valve 58 (FIG. 1) in the vacuum line 49 ahd having a handle portion extending from the mounting plate 8.

The vacuum systems 52 and 53 each comprise a pair of vacuum channels 59 and 60 respectively at opposite sides of the contact frame 32 and, like the vacuum system 51, are adapted to be connected to the source of vacuum by a fitting (not shown) that may be threaded into a bore through the cover plate 33 and intersecting the vacuum channels 59 and 60 for example at intake points 61 and 62 respectively. The vacuum channels 59 are connected to the sets of channels 46 by bores 63 through the contact frame 32 while the vacuum channels 60 are connected to the sets of channels 43 by bores 64 through the contact frame 32. The application of vacuum to the systems 52 and 53 is controlled by valves 65 and 66 respectively in the vacuum line 49 and having handle portions extending from the mounting plate 8.

To position the negatives and the proof paper with precision on the contact frame 32, there is provided locator pins adapted to project from the surface of the frame and to be received within holes in the negatives and proof paper. As shown in FIG. 8, the locator pins include a pair of pins 67 and a pair of pins 68 for each of the sets of channels 35 and 39 respectively for receiving 11"×14" proofs and a pair of pins 69 for receiving 16"×20" proofs transversely of the channels 35 and 39.

As shown in FIGS. 5, 6 and 7, each of the pins 67 and 68 extends through a bushing 70 in the contact frame 32 and is urged downwardly into contact with a bar 71 by a compression spring 72 coiled about the pin and acting at its upper end against the underside of the cover plate 33 and at its lower end against an abutment 73 in the form of a pin extending through the pin 67/68. The pin is adapted to be lifted against the action of the spring 72 to where it projects above the contact frame 32 as shown in FIG. 6 by a cam 74 on the bar 71 which is movable endwise under the pin. When the cam 74 is withdrawn from beneath the pin 67/68, the pin is lowered by the spring 72.

As shown in FIG. 8 and 9, the pins 67 and 68 are arranged in four lines of four pins each endwise of the machine and the pins 69 are arranged in two lines of four pins each. A bar 71 is disposed directly under each of the lines of pins with cams 74 adapted to operate each of the pins. The bars are mounted beneath the cover plate 33 for endwise sliding in any suitable manner such as by brackets (not shown) that may be secured to the underside of the cover plate 33 by screw threaded into blind holes in the cover plate 33. Each of bars 71 has a rack 75 secured to the underside thereof that meshes with a pinion 76 on a shaft 77 that is journalled for rotation on the underside of the cover plate 33 and extends through the mounting plate 8 where there is secured a handle 78.

The cams 74 are arranged on the bars 71 so that the cams 74 associated with the pins 67 and 68 are adapted to raise the pins to their operative position when the handle 78 is turned in the direction of the arrow A in FIG. 5 and the bar 71 is moved in the direction of the arrow B. At the same time, the cams 74 associated with the pins 69, one of which is for convenience designated 74a in FIG. 5, face in the other direction and are arranged relative to the pins 69 so that when the bars 71 move in the direction of the arrow B, the cams are moved from under the same and they are lowered by the springs 72. Conversely, when the handle 78 is moved in the opposite direction, that is, in the direction of the arrow C in FIG. 5 and the bars 71 are moved in the direction of the arrow D, the pins 67 and 68 are lowered and the pins 69 are raised. In an intermediate position all of the pins 67, 68 and 69 are in their lowered position.

In operation, the machine is adapted to receive simultaneously eight 11"×14" proofs. To receive the proofs, the handle 78 is turned in the direction of the arrow A in FIG. 5 to raise the pins 67 and 68 and to lower the pins 69. With the light carriage 18 in its open position, the proof paper and negatives are positioned on the contact frame 32 with the pins being received in holes in the paper to effect registration thereof. When the proof paper and negative are positioned on each pair of pins 67 and 68, the handles 58 and 66 are turned to open the respective valves and to apply vacuum to the vacuum distribution systems 51 and 52, and thus to the sets of vacuum channels 35 and 39 on the one hand and to the vacuum channels 46 on the other hand to hold the negatives and proof paper firmly in place and in contact with each other. The light carriage is then pulled forward to its closed position which through the microswitch 29 energizes the lamps 28. The lamps 28 are automatically deenergized at the completion of the exposure cycle by the timer at the control panel 12 after which the light carriage can be moved to its open position and the negatives and the exposed proof paper removed.

For 16"×20" proof paper, the handle 78 is turned in the direction of the arrow C to lower the pins 67 and 68 and to raise the pins 69. With the light carriage 18 in its open position four sets of proof paper and negatives are adapted to be positioned on the contact frame 32 with the pins 69 being received in holes therein to position the same accurately relative to each other. The handles 58 and 65 are then turned to open the respective valves and to apply vacuum to the vacuum distribution systems 51 and 53 and thus to the sets of vacuum channels 35, 39 and 43 to hold the negatives and proof paper firmly in place and in contact. Again, the light carriage 18 is pulled forward to its closed position, which, through the microswitch 29 automatically initiates the exposure cycle that is then in turn automatically ended by the timer, after which the light carriage is moved to its open position and the negatives and exposed proof paper are removed.

For larger size proofs, the handle 78 can be moved to its centered position in which all of the pins 67, 68 and 69 are lowered and the surface of the contact frame 32 is thus flush and adapted to receive proof paper up to the dimensions of the frame 32—that is, up to an overall dimension of 33"×46".

Modifications from the preferred embodiment herein disclosed will be obvious to those skilled in the art.

I claim:

1. In a proofing machine, a frame having a work supporting surface, a plurality of vacuum channels in said surface for holding proof paper and negatives in contact therewith, a source of vacuum connected to said vacuum channels and vacuum controls for selectively applying vacuum from said vacuum source to said vacuum channels, locator pins supported relative to said frame for endwise movement between positions in which the ends thereof extend above said work supporting surface and are adapted to be received within locating holes in the negatives or are disposed below said work supporting surface, means for moving said locator pins selectively between said positions, and a light carriage having a top wall and depending side walls, supporting means for mounting said carriage over said frame with the top wall thereof spaced from and substantially parallel to said work supporting surface and with the side walls extending toward said work supporting surface to define a light chamber, said supporting means providing for movement of said light carriage between a closed position in which the top wall overlies said work supporting surface and an open position in which negatives and proof paper are adapted to be loaded onto said work supporting surface, a plurality of lamps mounted and distributed in said light carriage beneath said top wall to provide uniform illumination over said work supporting surface, and control means adapted to be actuated upon movement of said light carriage into the closed position to energize said lamps and means for automatically deenergizing the lamps at the completion of the exposure cycle.

2. In a proofing machine in accordance with claim 1 in which said means for moving said locator pins comprises a bar mounted for endwise movement parallel to said work supporting surface, cam means carried by said bar and adapted to engage and to raise said pins, spring means for biasing said pins into engagement with said cam means, and means for importing movement to said bar.

3. In a proofing machine in accordance with claim 1 in which said vacuum channels define a plurality of proof positions including a side-by-side arrangement of two smaller proof positions of substantially equal size and a larger proof position overlying the two smaller proof positions.

4. In a proofing machine in accordance with claim 3 in which one of said smaller proof positions comprises two separate sets of vacuum channels each of which is adapted to be used at the same time with one of the smaller proofs and only one of which is adapted to be used together with the set of vacuum channels for the other of said smaller proof positions for the larger proofs, and means for independently applying vacuum selectively to said two separate vacuum channels.

5. In a proofing machine in accordance with claim 4 in which an additional vacuum channel is provided for use with the larger proofs, and means are provided for independently applying vacuum selectively to said additional vacuum channel.

6. In a proofing machine in accordance with claim 3 in which there are provided separate sets of locator pins for the smaller proofs and the larger proofs, and said means for moving said locator pins are adapted to extend the ends of said pins alternatively above said work supporting surface or to dispose all of said pins below said work supporting surface.

7. In a proofing machine, a frame having a work supporting surface, a plurality of vacuum channels in said surface for holding proof paper and negatives in contact therewith, said vacuum channels defining a plurality of proof positions including a side-by-side arrangement of two smaller proof positions of substantially equal size and a larger proof position overlying the two smaller proof positions, one of said smaller proof positions comprising two separate vacuum channels both of which are adapted to be used simultaneously with the smaller proof positions and only one of which is adapted to be used together with the other of said smaller proof positions for the larger proof position, and means for independently applying vacuum selectively to said two separate vacuum channels.

8. In a proofing machine in accordance with claim 7 in which an additional vacuum channel is provided for use with the larger proofs, and means are provided for independently applying vacuum selectively to said additional vacuum chamber.

* * * * *